United States Patent
Gonring

(10) Patent No.: US 9,809,292 B1
(45) Date of Patent: Nov. 7, 2017

(54) SYSTEM AND METHOD FOR STEERING WHEEL CORRECTION ON A MARINE VESSEL

(71) Applicant: Brunswick Corporation, Lake Forest, IL (US)

(72) Inventor: Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 213 days.

(21) Appl. No.: 14/596,606

(22) Filed: Jan. 14, 2015

(51) Int. Cl.
*B63H 25/02* (2006.01)
*G05D 1/02* (2006.01)

(52) U.S. Cl.
CPC ........... *B63H 25/02* (2013.01); *G05D 1/0206* (2013.01)

(58) Field of Classification Search
None
See application file for complete search history.

(56) References Cited

U.S. PATENT DOCUMENTS

| | | | |
|---|---|---|---|
| 4,893,800 A | 1/1990 | Tabata | |
| 6,273,771 B1 | 8/2001 | Buckley et al. | |
| 6,322,404 B1 | 11/2001 | Magee et al. | |
| 6,942,530 B1 | 9/2005 | Hall et al. | |
| 7,267,068 B2 | 9/2007 | Bradley et al. | |
| 7,398,742 B1 | 7/2008 | Gonring | |
| 8,265,830 B2 | 9/2012 | Mizutani | |
| 9,359,057 B1* | 6/2016 | Andrasko | B63H 20/12 |
| 2012/0045951 A1* | 2/2012 | Washino | B63H 20/12 |
| | | | 440/63 |

OTHER PUBLICATIONS

Lord TFD® Steering Units for Steer-by-Wire Systems, Lord AskUsHow™, KP PB8130 (Rev 0 4/14), Lord Corporation, 8 pages.

* cited by examiner

*Primary Examiner* — Rami Khatib
*Assistant Examiner* — Gerrad A Foster
(74) *Attorney, Agent, or Firm* — Andrus Intellectual Property Law, LLP

(57) ABSTRACT

A method for controlling steering alignment in a marine vessel includes detecting a rotational position of a steering device and detecting a rotational addition of a steerable component, wherein the steerable component is couplable to a marine vessel and steerable to a plurality of positions so as to vary the direction of movement of the marine vessel. The rotational position of the steering device and the rotational position of the steerable component are then compared. The operation between the steering device and the steerable component is then automatically adjusted while the steering device is moved by a user until alignment between the steering device and the steerable component is reached.

16 Claims, 12 Drawing Sheets

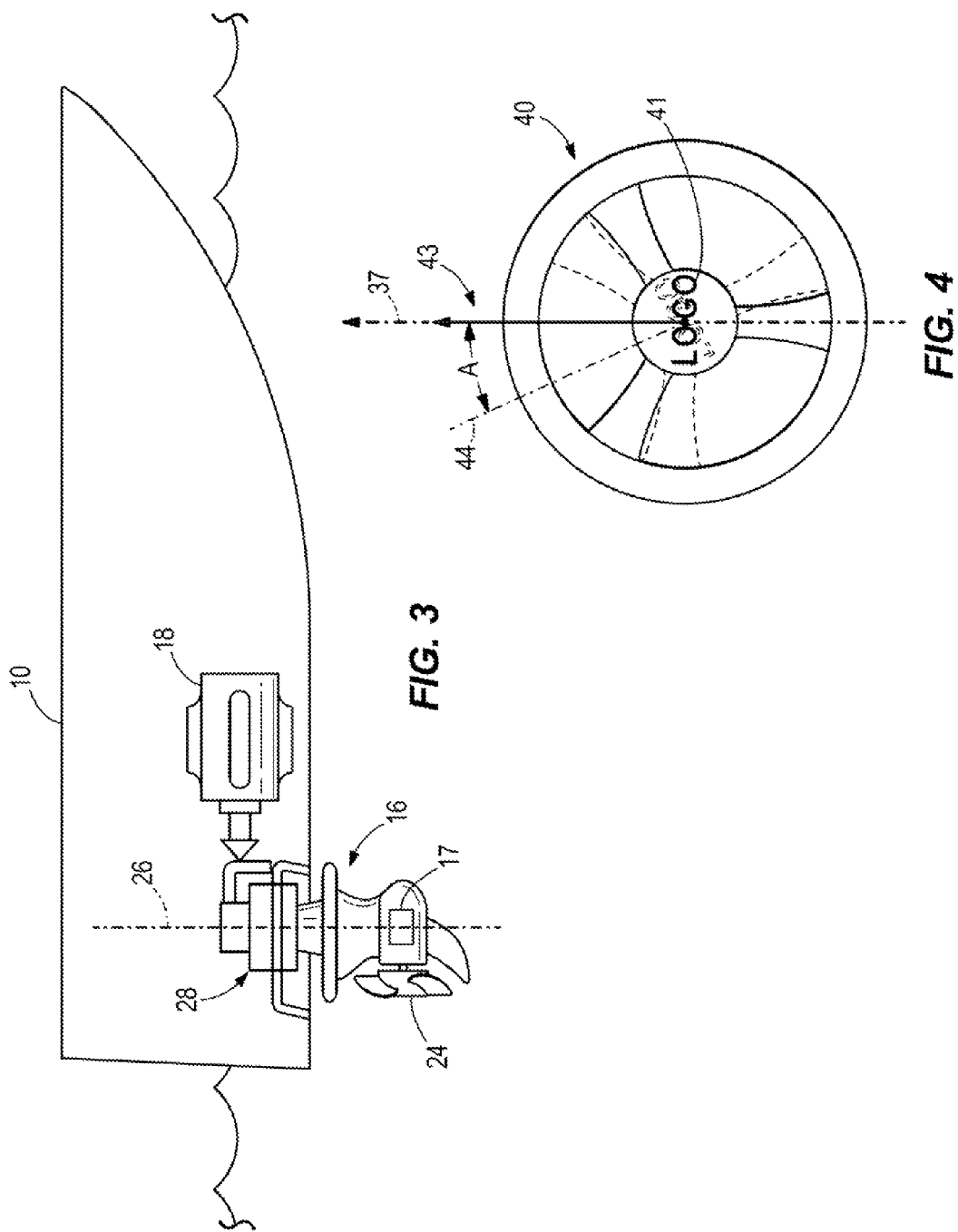

SYSTEM AND METHOD FOR STEERING WHEEL CORRECTION ON A MARINE VESSEL

FIELD

The present disclosure relates to systems and methods for controlling steering of a marine vessel. More specifically, the present disclosure relates to steering control methods and systems that achieve alignment between a steering device and a steerable component, such as marine engine.

BACKGROUND

The following U.S. Patents and patent application are incorporated herein by reference in entirety:

U.S. Pat. No. 6,942,530 discloses an engine control strategy for a marine propulsion system that selects a desired idle speed for use during a shift event based on boat speed and engine temperature. In order to change the engine operating speed to the desired idle speed during the shift event, ignition timing is altered and the status of an idle air control valve is changed. These changes to the ignition timing and the idle air control valve are made in order to achieve the desired engine idle speed during the shift event. The idle speed during the shift event is selected so that the impact shock and resulting noise of the shift event can be decreased without causing the engine to stall.

U.S. Pat. No. 6,322,404 discloses a Hall effect rotational position sensor mounted on a pivotable member of a marine propulsion system and a rotatable portion of the rotational position sensor attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus. A bus access manager, such as a CAN Kingdom network, is connected in signal communication with the controller to regulate the incorporation of additional devices to the plurality of devices in signal communication with the bus. The controller is connected in signal communication with each of the plurality of devices on the communication bus. The input and output devices can each transmit messages to the serial communication bus for receipt by other devices.

U.S. Pat. No. 4,893,800 discloses a power unit mount that includes a housing in which first and second electrode bodies are suspended and which is filled with a fluid which exhibits a change in viscosity when a voltage is applied there across. The control of the voltage application is determined by a control circuit which is operatively connected to a plurality of sensors which include an engine speed sensor, a road wheel speed sensor, a relative displacement sensor and an absolute displacement sensor. A variant includes a solenoid powered vibration generator which can be energized under predetermined conditions in a manner to improve vibration attenuation.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a center line of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,398,742 discloses a steering assist system that provides differential thrusts by two or more marine propulsion devices in order to create a more effective turning moment on a marine vessel. The differential thrusts can be selected as a function of the magnitude of turn commanded by an operator of the marine vessel and, in addition, as a function of the speed of the marine vessel at the time when the turning command is received.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure arose during continuing research and development of steering devices for marine vessels, steering control systems, and methods of mounting and arranging steering devices with respect to marine vessels.

In one embodiment, a method for controlling steering alignment in a marine vessel includes detecting a rotational position of a steering device and detecting a rotational addition of a steerable component, wherein the steerable component is couplable to a marine vessel and steerable to a plurality of positions so as to vary the direction of movement of the marine vessel. The rotational position of the steering device and the rotational position of the steerable component are then compared. The operation between the steering device and the steerable component is then automatically adjusted while the steering device is moved by a user until alignment between the steering device and the steerable component is reached.

Another embodiment of the method of controlling steering alignment in a marine vessel includes detecting a rotational position of a steering device and detecting a rotational position of a steerable component, wherein the steerable component is couplable to a marine vessel and steerable to a plurality of positions so as to vary the direction of movement of the marine vessel. The rotational position of the steering device is then compared to the rotational position of the steerable component. An aligned position of the steerable component is calculated that corresponds with the rotational position of the steering device. The steerable component is then automatically rotated towards the aligned position.

A system for controlling steering alignment in the marine vessel includes a steering position sensor that senses a rotational position of a steering device and a component position sensor that senses a rotational position of a steerable component coupled to a marine vessel and steerable to a plurality of positions so as to vary the direction of movement of the marine vessel. The steering actuated is communicatively connected to the steering device and the steerable component to actuate steering of the marine vessel. A controller is communicatively connected the steering actuator. The controller compares the rotational position of the steering device to the rotational position of the steerable component and controls the steering actuator to adjust the operation between the steering device and the steerable component until alignment between the steering device and the steerable component is reached.

BRIEF DESCRIPTION OF THE DRAWINGS

The present disclosure is described with reference to the following FIGURES. The same numbers are used throughout the FIGURES to reference like features and like components.

FIG. 3 illustrates a schematic cross sectional side view of a marine vessel according to the present disclosure.

FIG. 4 illustrates an exemplary steering device for providing an operator-initiated steering command to the steering component(s) of the marine vessel.

DETAILED DESCRIPTION

In the present description, certain terms have been used for brevity, clarity, and understanding. No unnecessary limitations are to be inferred therefrom beyond the requirement of prior art as such terms are used for descriptive purposes only and are intended to be broadly construed.

Circumstances arise where a steering device, such as a steering wheel, becomes misaligned from the steerable component of a marine vessel, such that a center position of a steering device does not align with a center position of the steerable device. Through analysis, research, and development, the present inventor recognized several problems with prior art systems and methods for aligning a steering device, such as a steering wheel, in a marine vessel to a steerable device, such as a marine engine. The present inventor recognized that there is a need to have a centered steering alignment between the steering device and the steerable component so that steering devices with decals, logos, displays, or controls mounted thereon can be used with maximum ease and effectiveness. For example, a steering wheel, such as that illustrated in FIG. 3, may have a configuration that lends itself to being oriented to a particular center position. In the example of FIG. 3, the steering device 40 has a logo 41 in the center thereof. In its centered position 43, the logo is facing upward and the steering wheel is symmetrical around a vertical center axis 37. When the steering device 40 is in alignment with the steerable component, the angle A of the steering device 40 corresponds to a set steering angle of the steering component. Thus, a user can determine an approximate angle of the steering component by looking at the position of the steering device 40 with respect to center position 43. Likewise, in embodiments having displays or controls on the steering device 40, having a centered steering alignment can be important for the usability of such displays and controls.

Currently-available steering wheel and/steering device correction systems are designed to suddenly turn a steering wheel to a prescribed position upon startup or helm transfer. Motorized steering actuators are used to motor the steering device to a centered or aligned position. Such automatic movement of the steering device causes problems, such as injury or discomfort to an operator. The present inventor also recognized that motorized steering actuators are large, complicated, cumbersome, expensive, and prone to problems. Accordingly, the inventor recognized a need to enable the use of a non-motorized steering wheel actuator that can provide alignment correction without the use of motorized actuator components to provide motorized movement to the steering wheel.

Figure 1:
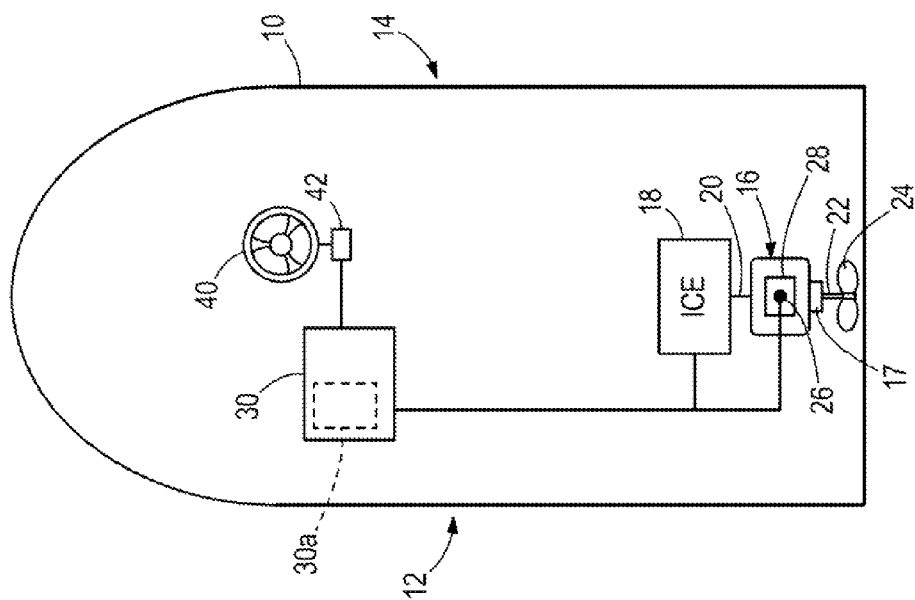
FIG. 1 illustrates a schematic view of a marine vessel employing a method and system for steering alignment according to the present disclosure.

FIG. 1 illustrates a marine vessel 10 having a port side 12 and a starboard side 14. A steerable component 16 is located proximate a stern of the marine vessel 10. Referring also to FIG. 3, in the example shown, the steerable component 16 is couplable to, or able to be coupled to, a marine vessel 10. The steerable component 16 may comprise any of a pod drive, an outboard motor or engine, a stern drive, or a jet drive. Alternatively, if the marine vessel 10 is provided with an inboard drive, the steerable component 16 may be a rudder. The steerable component 16 is coupled in torque transmitting relationship with an internal combustion engine 18 via an output shaft 20. The steerable component 16 may include a propeller shaft 22 that connects to a propeller 24. When torque is transmitted from the internal combustion engine 18 via the shaft 20 to the propeller shaft 22 and the propeller 24, a thrust is produced to propel the marine vessel 10 in a direction that corresponds to a steering position of the steerable component 16.

In the example of FIGS. 1 and 3, the steerable component 16 is steerable around a vertical steering axis 26, it being understood that different types of marine vessels and steerable components may have steering axes that are not vertically aligned. The steering axis 26 runs through a steering actuator 28, which actuates the steerable component 16 to one of a plurality of positions so as to control direction of movement of the marine vessel 10.

The internal combustion engine 18 and the steering actuator 28 are communicatively connected to a controller 30. The controller 30 has a memory and a programmable processor. As is conventional, the processor can be communicatively connected to a computer readable medium that includes volatile or nonvolatile memory upon which computer readable code is stored. The processor can access the computer readable code on the computer readable medium, and upon executing the code carries out the functions as described herein.

The controller 30 is also communicatively connected to a steering drive 40, which may exemplarily be a steering wheel. It should be understood that other devices may comprise the steering device 40 for initiating steering commands to steer the steerable component 16.

In the example shown, the controller 30 includes a steering alignment control section 30a, which includes software that is programmed to carry out the functions and methods described herein below. It should be understood that a separate steering alignment control section 30a need not be provided, and is shown here schematically for purposes of describing the specific functions and methods it is programmed to carry out.

Figure 2:
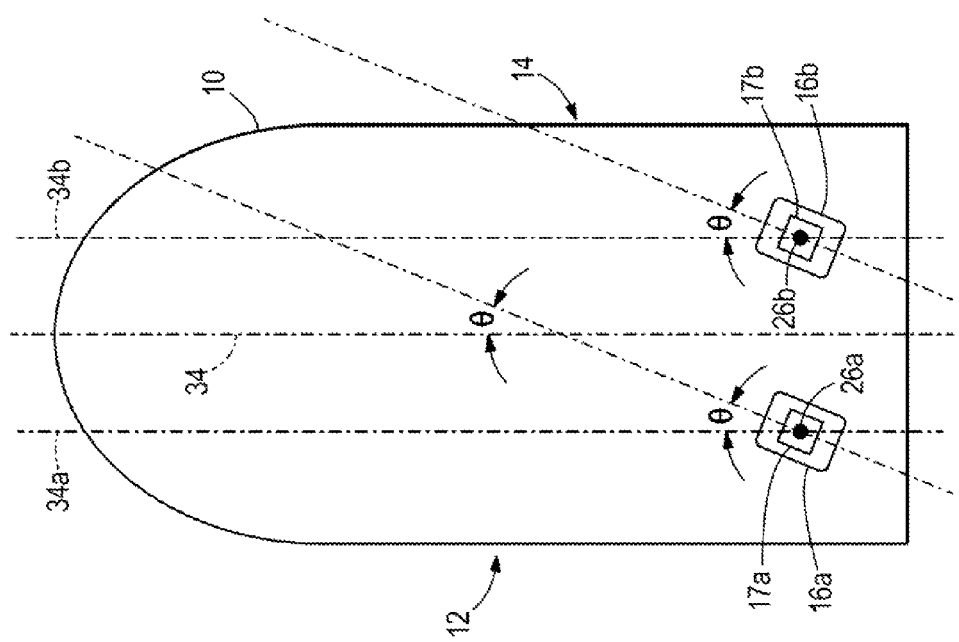
FIG. 2 illustrates a schematic view of a marine vessel having two steerable components, and the steering angles of the steerable components.

Now referring to FIG. 2, the capability of the steerable component 16 to be steered to a plurality of positions will be described. FIG. 2 illustrates two steerable components 16a, 16b. Both of the steerable components could comprise pod drives, outboard engines, or could comprise any of the other steerable components mentioned herein above. It should be understood that the principles discussed herein with reference to the two steerable components 16a, 16b are equally applicable to the single steerable component 16 of FIG. 1, unless noted as otherwise. The principles discussed herein also apply when more than two steerable components are provided on the marine vessel 10, and the number of steerable components is not limiting on the scope of the present disclosure. As shown in FIG. 2, both of the steerable components 16a, 16b are steered around their vertical steering axes 26a, 26b to a steering angle of θ, where θ is related to a virtual center line 34 (and parallel center lines 34a and 34b) of the marine vessel 10. θ is an angle of a thrust vector produced by a propeller associated with each steerable component 16a, 16b with respect to the virtual center line 34.

Referring now also to FIG. 4, a certain degree of actuation of a steering device 40 shown, will correspond to a particular steering angle θ of the steerable components 16, 16a, 16b, according to a drive angle map stored in the memory of the controller 30. For example, if the steering device 40 is turned from a center position 43 (or straight-ahead) by an angle A (or percentage of total allowable wheel angle) to a turned position 44 (shown in dashed lines), this angle (or percentage) A maps to a particular steering angle θ of the steerable components 16, 16a, 16b. This ratio between angle A and steering angle θ is the steering ratio. For ease of explanation, the steerable components 16a, 16b are assumed to be turned to the same steering angle θ mapped from the position of the steering device 40, although it should be understood that in some embodiments, the steerable components 16a, 16b are instead steered to independently-calculated steering angles that are meant to achieve a particular movement of the marine vessel 10. Although a steering device 40 is shown in FIG. 4 as a steering wheel, other steering devices may be employed. For example, movement of a joystick around its axis could also be mapped to a particular steering angle θ of the steerable components 16, 16a, 16b.

The present disclosure provides a system and method for controlling the steering alignment between a steering device 40 and a steerable component 16 that overcomes the problems with prior art systems recognized by the inventor. As depicted in FIGS. 1-3, the system comprises a steering position sensor 42 coupled to a steering component 16 on a marine vessel 10. The steerable component 16 is steerable to a plurality of positions so as to vary a direction of movement of the marine vessel 10. The position of the steerable component 16 is detected by a component position sensor 17. The steering angle θ of the steerable components 16, 16a, 16b can be detected by a component position sensor 17, 17a, 17b. The angle A of the steering device 40 can be detected by the steering position sensor 42 operably connected to the steering device 40 in order to detect the position thereof. The steering device 40 is operable to control the position of the steerable component 16 to vary the direction of the marine vessel 10. The steering position sensor 42 senses a rotational position of a steering device 40 to detect a steering command created by an operator turning the steering device 40.

A controller 30 is communicatively connected to a steering actuator 28 that actuates movement of the steerable component 16. The steering device 40 provides to the controller 30 an operator-initiated steering command to steer the steerable components 16 to one of a plurality of positions. The steering position sensor 42 provides to the controller 30 an indication of a rotational position of the steering device 40. The controller also receives a rotational position of the steerable component 16 from the component position sensor 17. The controller acts to compare the rotational position of the steering device 40 and the position of the steerable component 16. The controller 30 acts to achieve alignment between the steering device 40 and the steerable component 16 by adjusting the operation between the steering device and the steerable component until such time as alignment is reached. In one embodiment, alignment between the steering device 40 and the steerable component 16 is reached when the angle A of the steering device 40 is equal to or corresponds to the steering angle θ. Alternatively or additionally, alignment between the steering device 40 and the steerable component 16 may be reached when the centered position 43 of the steering device 40 (FIG. 4) corresponds with a virtual center line 34 (and parallel center lines 34a and 34b) of the marine vessel 10, and thus the straightforward drive position where the steering angle θ is zero. In such an embodiment, reaching alignment between the steering device 40 and the steerable component 16 may not require positioning the steering device 40 in the centered position 43 and the steerable component 16 at a zero steering angle θ, but that the turned position 44 and the angle A of the steering device 40 is proportional to, or corresponds to, the position of the steerable component 16 at steering angle θ. In an exemplary embodiment, the change in the angle A of the steering device 40 of 1° may correspond to a change in steering angle θ of 1°. This would be a steering ratio of 1/1. In other embodiments, a change in angle A of the steering device 40 by 1° may correspond to more or less than 1° of change in the steering angle θ of the steerable component 16.

The method and system disclosed herein avoids the above-described problems with prior art steering systems by achieving alignment between the steering device 40 and the steerable component 16 without using motorized movement of the steering device 40. In one embodiment, alignment is achieved by adjusting the operation between the steering device 40 and the steerable component 16 while the steering device 40 is moved by a user. In another embodiment, alignment is achieved by adjusting the operation between the steering device 40 and the steerable component 16 by automatically moving the steerable component 16 towards an angle θ that corresponds with an angle A of the steering device 40. In various embodiments described herein, the operational adjustment between the steering device 40 and the steerable component 16 may occur when the vessel 10 is in motion, such as when the internal combustion engine 18 is in a forward drive position. Alternatively, the operational adjustment between the steering device 40 and the steerable component 16 may occur when the vessel 10 is stationary, such as upon startup of the internal combustion engine 18 when a boat is docked. In other embodiments, the adjustment to the operation between the steering device 40 and the steerable component 16 may occur when the vessel 10 is drifting, such as when the internal combustion engine 18 is in an idle mode or neutral gear, or when the vessel is moving, such as above a predefined minimum speed and/or below a maximum speed.

The methods and systems disclosed herein allow use of a non-motorized steering actuator 28 that is smaller, cheaper, and less prone to failure than the motorized steering actuators used in prior art systems. In one embodiment, the steering actuator 28 may be a logical resistance actuator or tactile feedback device that uses a magnetic field and magnetic fluid to create a variable resistance between the operation of the steering device 40 and the steerable component 16. By way of example, the steering actuator 28 may be LORD TFD® steering unit for a steer-by-wire system. Furthermore, the steering actuator 28 may have integrated therein a steering position sensor 42, such as is provided by the LORD TFD® steering unit.

The method of correcting steering device 40 alignment disclosed and described herein may be executed at any time when a condition of steering device 40 misalignment is detected. In an exemplary embodiment, the methods disclosed and described herein of correcting steering device 40 alignment may be executed upon key-up of the internal combustion 18, upon helm transfer where drive control is transferred between steering devices 40, and/or when steering control of a vessel 10 is changed from an automatic steering control to steering control by an operator at a steering device 40.

Various embodiments of methods 5 for controlling steering misalignment may be executed by the controller 30 controlling the operation between steering device and the steerable component 16. In the embodiments depicted and described in FIGS. 5-8, the steerable component 16 is exemplified as an outboard motor, which is an engine mounted to the stern of a vessel 10. Thus, steerable device 16 is exemplified as engine 16 herein. However, it should be understood that the methods depicted and described with respect to FIGS. 5-8 may apply equally to embodiments wherein the steerable component 16 is another steerable device, such as a pod drive, a stern drive, a jet drive, or an inboard drive with a steerable rudder.

Figure 5A:
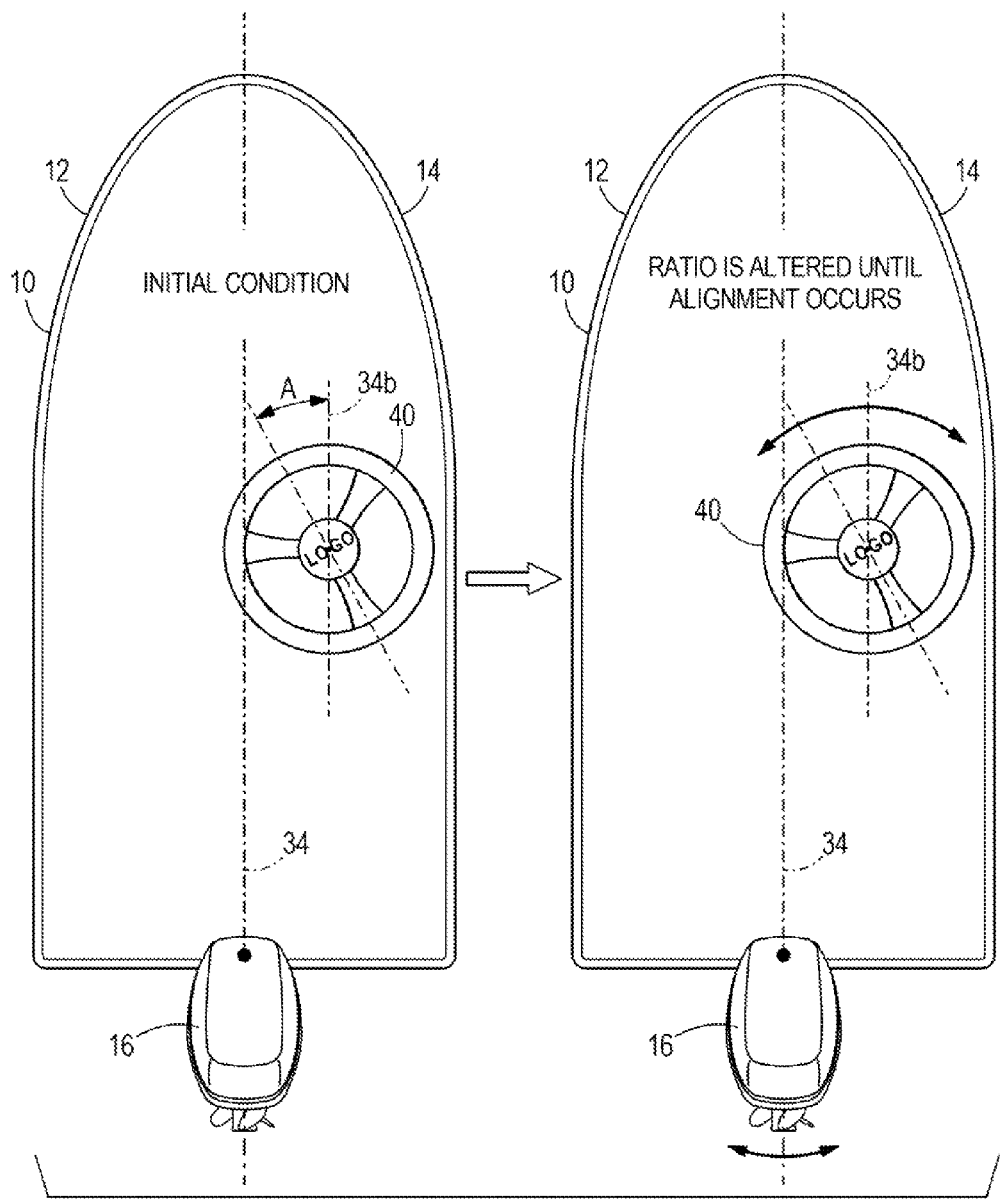
FIGS. 5A and 5B illustrate an embodiment of a system and method of steering alignment.
Figure 5B:
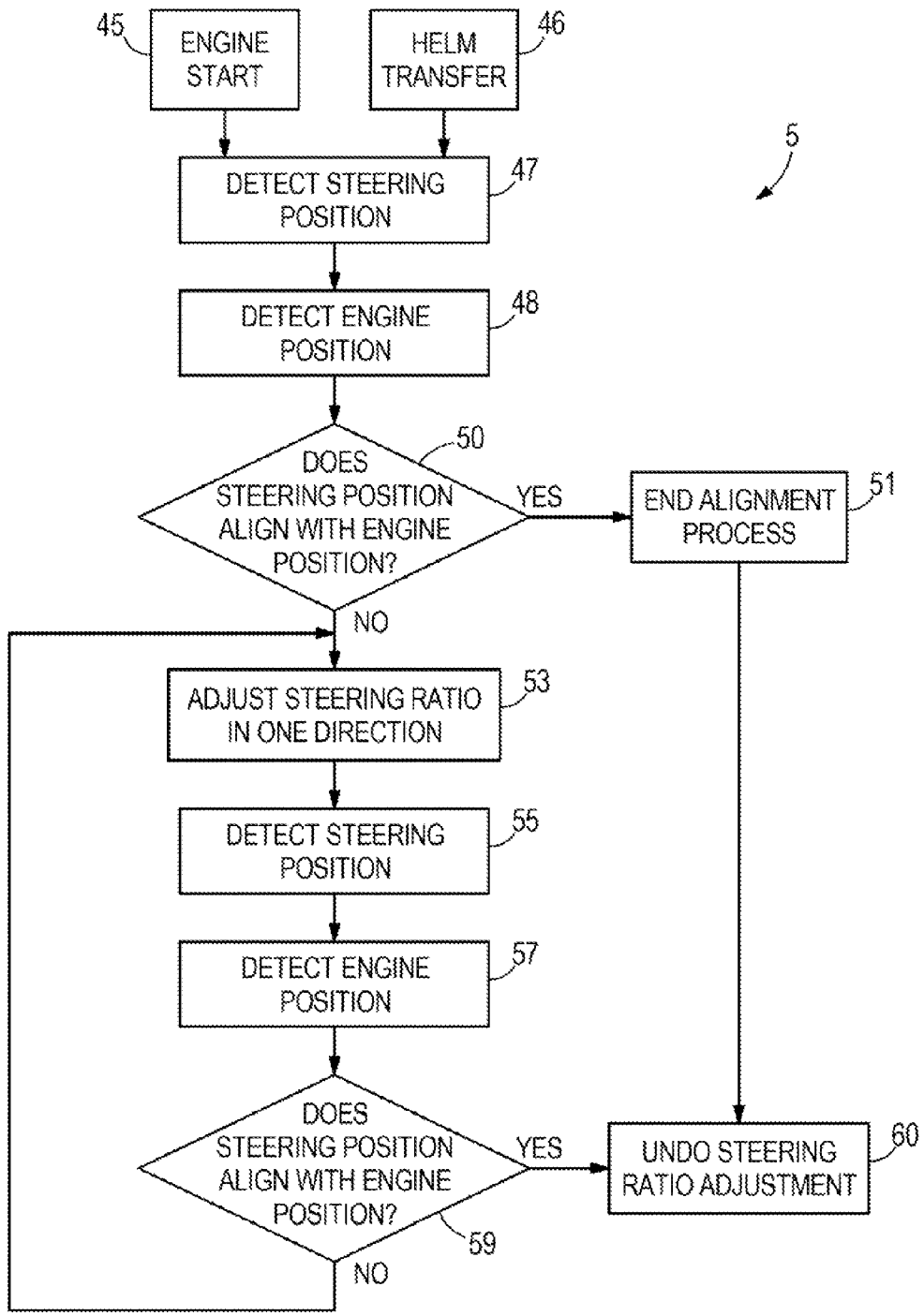

In one embodiment, the controller 30 adjusts the operation between the steering device 40 and the steerable component 16 according to the method depicted in FIGURES 5A and 5B. In the depicted method, a steering ratio between steering device 40 and the engine 16 may be adjusted or changed to require relatively more movement of the steering device in one rotational direction than in an opposite rotational direction. The steering ratio is the ratio between a turn of the steering device 40 and the corresponding turn of the steerable component 16. In other words, the steering ratio is the amount of degrees an operator has to turn the steering device in order to produce a certain turn of the steerable component 16. As applied to the exemplary embodiment depicted in FIGS. 2 and 4, the steering ratio is the ratio of the change in angle A of the steering device 40 to the resultant change in the steering angle 9 of the engine 16.

In the exemplary condition depicted in FIG. 5A, the steering device 40 of the vessel 10 is misaligned from the engine 16. The engine 16 is in a centered, forward-facing position, such as in line with the virtual center line 34 (FIG. 2). The steering device 40, however, is angled to the port side 12 of vessel 10 at angle A as compared to a centered position 43. As applied to the exemplary situation depicted in FIG. 5A, the first exemplary method of adjusting the operation between steering device 40 and the engine 16 would adjust the steering ratio to require relatively more motion of the steering device 40 towards the starboard side 14 (in the clockwise direction) than towards the port side 12 (counter clockwise direction) of the vessel 10. Over time, alignment between the steering device 40 and the engine 16 will be reached, at which point the steering ratio between the engine 16 and the steering device 40 will be returned to the normal, or previous, ratio.

Turning to FIG. 5B, an exemplary embodiment of a method 5 of correcting steering misalignment in a marine vessel may be initiated upon engine start 45 or helm transfer 46. At step 47, a steering position is detected, such as by detecting a rotational position of a steering device 40 using a steering position sensor 42. A rotational position of a steerable component 16 is also detected at step 48. Then, the rotational position of the steering device 40 is compared to the rotational position of the engine 16 to determine whether the rotational position of the steering device aligns with the rotational position of the engine at step 50. If the steering device 40 and the engine 16 are aligned, then the alignment process is terminated at step 51. If the rotational position of the steering device 40 does not align with the rotational position of the engine 16, then the operation between the steering device and the steerable component is adjusted by adjusting the steering ratio in one rotational direction as compared to the other at step 53. For example, the steering ratio may be adjusted to require relatively more movement of the steering device 40 in the clockwise direction than in the counterclockwise direction to produce the same angular movement of the steerable component 16. At step 55, the rotational position of the steering device 40 is again detected, as is the position of the engine 16 at step 57. At step 59, the rotational position of the steering device 40 is again compared to the rotational position of the engine 16 to determine whether alignment has been reached. If alignment has not been reached, the system may return to step 53 where steering ratio may be further adjusted or may be maintained at the previously-adjusted ratio. The steps 53, 55, 57, and 59 are repeated until alignment between the steering device 40 and the engine 16 is reached, at which point the steering ratio adjustment is removed, at step 60, and the steering ratios become equivalent in both rotational directions. Following the removal of the steering ratio adjustment at step 60, the realignment process is terminated at step 51.

The steering ratio may be adjusted such that the adjustment is not noticeable by a user, and thus the steering device 40 alignment may be corrected without interrupting the operator or having operator discomfort. By way of example, the steering ratio may be adjusted to require the operator to turn the steering device 40 by 5° in the clockwise, or starboard 14, direction to effectuate a change of 1° in the steering angle θ of the steerable component 16. In another embodiment, the steering ratio may be adjusted by increasing the steering angle in one direction by a certain percentage over the steering ratio in the other direction. For example, the steering ratio could be increased by 25% in the clockwise direction as compared to the steering in the counterclockwise direction. In still other embodiments, the steering angle could be decreased in one direction as compared to the other direction. Thus, in the situation depicted in FIG. 5A, the steering ratio could be decreased in the counterclockwise direction as compared to the steering ratio in the clockwise direction. As an example, the steering ratio in the counterclockwise, or port side 12, direction could be decreased to require a turn of 0.5° for every 1° change of steering angle θ. In still other embodiments, the steering ratio may be increased in one direction and decreased in the opposite direction simultaneously.

The steering ratio adjustment may be determined by the controller 30 based on any of several factors, including the degree of misalignment between the steering device 40 and the steerable component 16, the speed at which the vessel 10 is traveling, the acceleration of the vessel 10, the change in angle A of the steering device 40 effectuated by an operator, and the position of the steering device 40. In one embodiment, the adjustment in the steering ratio is established by a lookup table accessible by the controller 30. The lookup table may set steering ratio adjustments based on any or all of the above-listed factors.

Figure 6A:
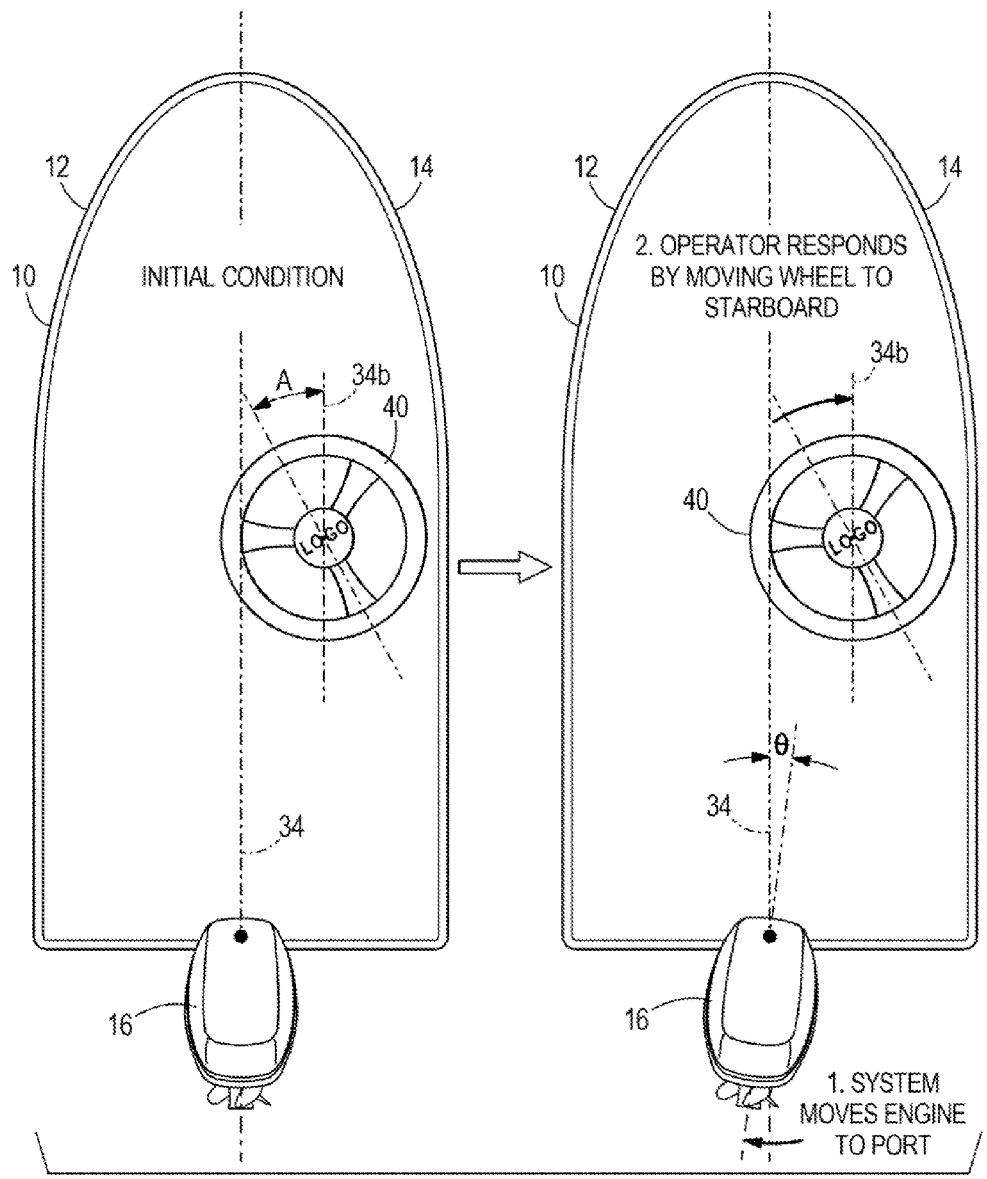
FIGS. 6A, 6B, and 6C illustrate another embodiment of a system and method of steering alignment.
Figure 6B:
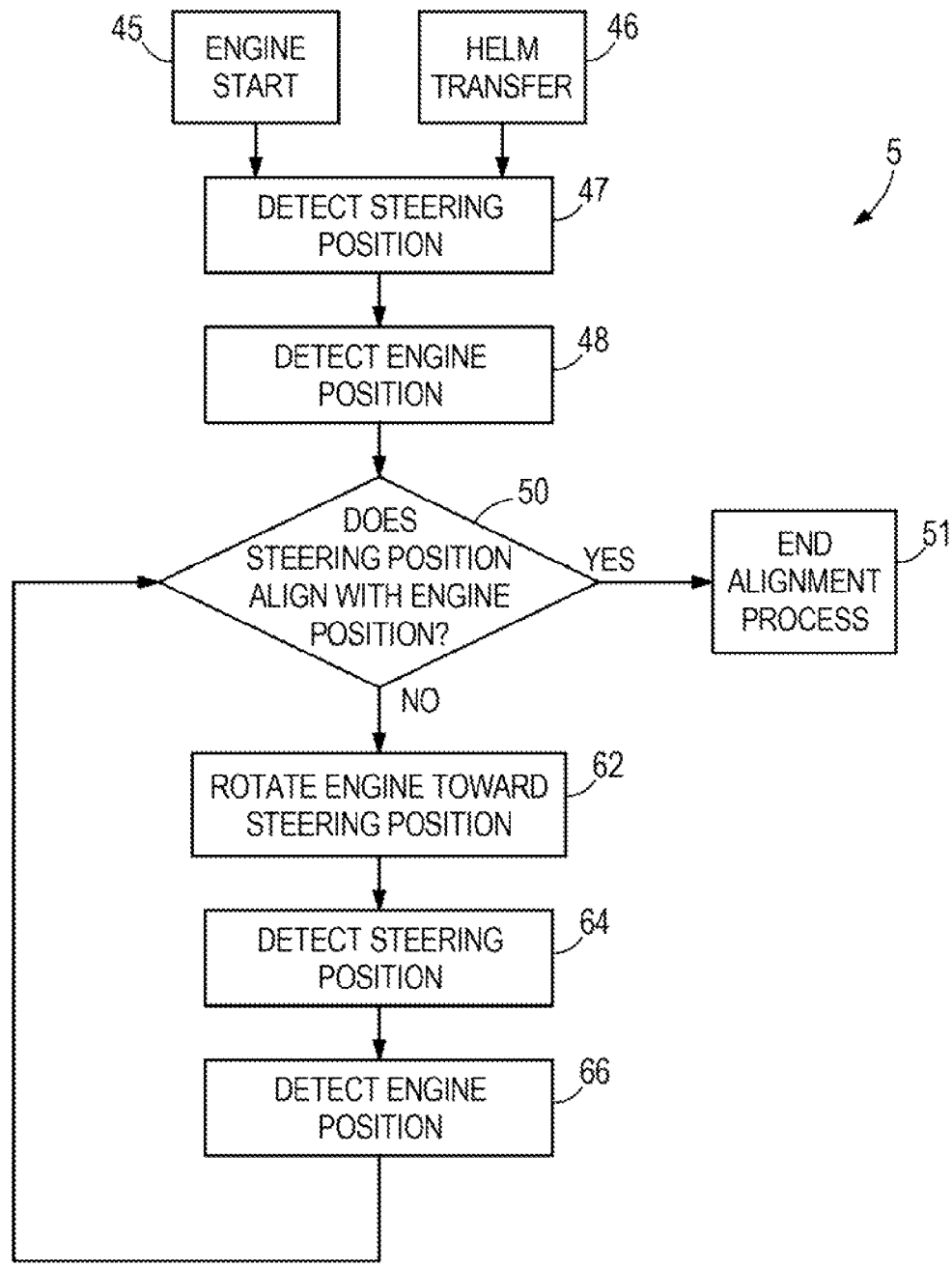
Figure 6C:
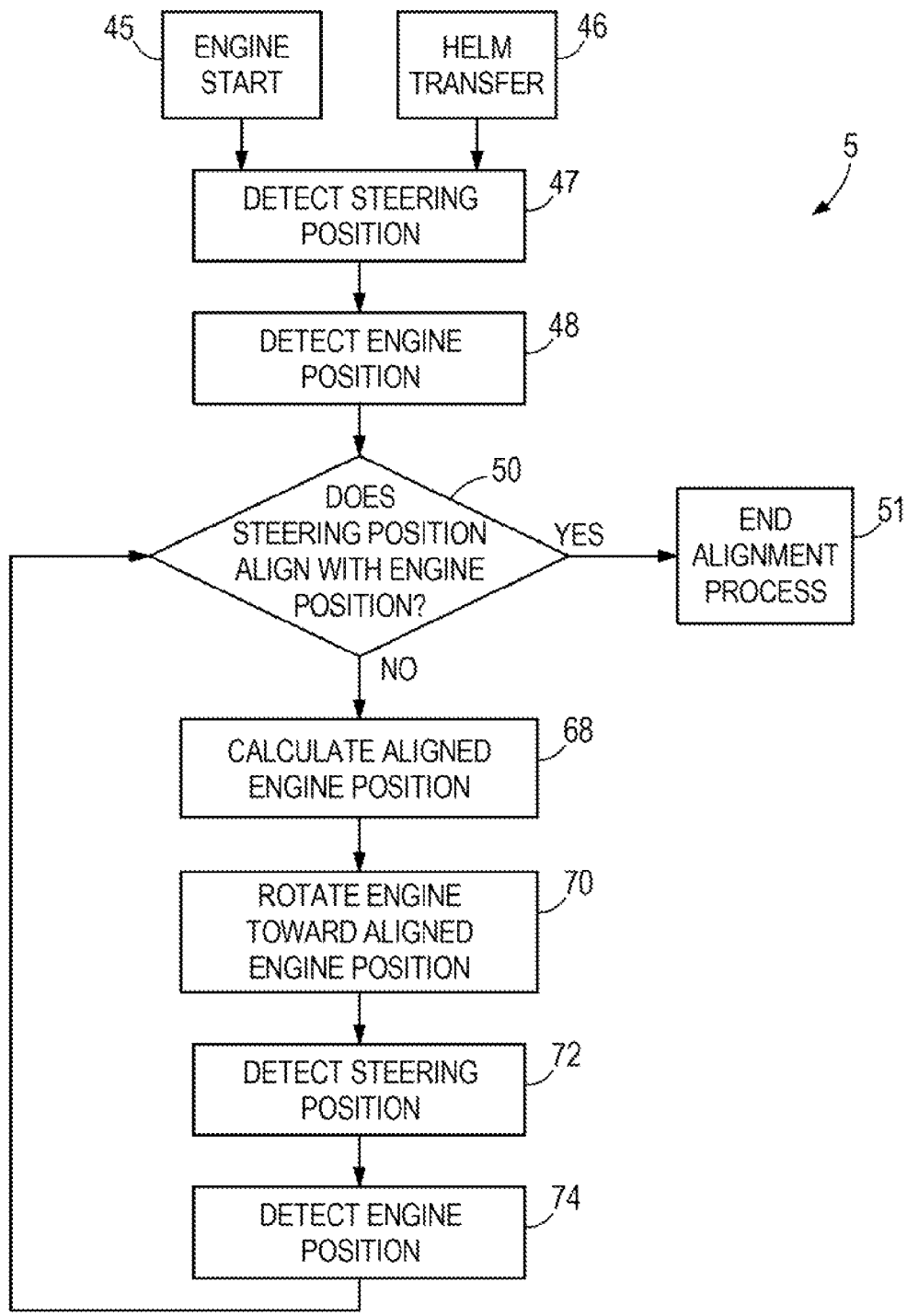

Another embodiment of method 5 of controlling steering alignment is depicted in FIGS. 6A-6C. As exemplified in FIG. 6A, the alignment of the steering device 40 may be corrected by automatically moving the engine 16 towards an aligned position with the steering device 40. The movement of the engine 16 may cause an operator to respond by turning the steerable device 40 to compensate for the change in the angle of the engine in order to maintain heading. Thereby, alignment may be achieved. Referring specifically to the scenario depicted in FIG. 6A, the steering device 40 is misaligned towards the port side 12 of the vessel 10. To correct the misalignment, the system may slowly move the engine 16 towards port side 12 and towards an aligned position, which is the position that corresponds with the position of the steering device 40. In other words, the engine 16 is moved towards a steering angle θ that corresponds with the angle A of the steering device 40. As the steerable device 40 is moved towards port side 12 and towards the aligned position, the operator may respond by moving the steering device 40 towards the starboard side 14 in an effort to maintain heading. Between progressive movement of the engine 16 to port and movement of the steering device 40 to starboard, alignment may be achieved. The magnitude or rate of the movement of the steerable device 40 is rotated may be determined by the controller 30 based on any of several factors, including the degree of misalignment between the steering device 40 and the steerable component 16, the speed at which the vessel 10 is traveling, the acceleration of the vessel 10, the change in angle A of the steering device 40 effectuated by an operator, and the position of the steering device 40.

FIGS. 6B and 6C depict two embodiments of a method 5 of controlling steering alignment effectuating the embodiment of FIG. 6A. Upon engine start 45 or helm transfer 46, a rotational position of a steering device 40 is detected at step 47, and a rotational position of engine 16 is detected at step 48. At step 50, the rotational position of the steering device 40 is compared to the rotational position of the engine 16. If the rotational positions of the steering device 40 and the engine 16 are aligned, then the alignment process is terminated at step 51. If the rotational position of the steering device 40 and the engine 16 do not align, then the system continues to step 62, where it automatically rotates the engine 16 towards a position that corresponds with the rotational position of the steering device 40. After the engine is rotated, the steering position is again detected at step 64. Here, the system may detect if an operator has responded to the step of rotating the engine 16 by moving the steering device 40 in an opposite direction to compensate. At step 66, an engine position may be detected again to provide an updated engine position. In other embodiments, the system may track the engine position by other means, such as by the controller 30 storing the instruction from step 62 to memory and using that as the current engine position. The system then returns to step 50, where the rotational position of the steering device 40 is compared to the rotational position of engine 16 to determine whether alignment has been reached. The method steps 60, 62, 64, and 66 may be repeated until alignment is reached, at which point the alignment process is terminated at step 51.

In the embodiment depicted in FIG. 6C, a method 5 of controlling steering alignment includes steps 45-50 as described above. In this embodiment, if the position of the steering device 40 does not align with the position of the engine 16 at step 50, then the system progresses to step 68 where an aligned position of the engine is calculated. The aligned position is the rotational position at which the engine 16 would align with the position of the steering device 40. For example, the aligned position of the engine 16 may be the position where the steering angle θ of the steerable component corresponds with the angle A of the steering device. Then, at step 70, the engine 16 is rotated toward the aligned position to a position between the rotational position of the engine detected at step 48 and the aligned position calculated at step 68. At step 72, the rotational position of the steering device 40 is again detected, for example to determine whether an operator has moved the steering device 40 to compensate for the change in engine position. At step 74, the rotational position of the engine 16 may also be detected to provide an updated engine position. Alternatively, as described above, step 74 may be omitted and the engine position may be determined as the position determined at step 70. The system then returns to step 50 where the rotational position of the steering device 40 is again compared to the rotational position of the engine 16 to assess whether alignment has been reached. Steps 50, 68, 70, 72, and 74 are repeated until alignment is reached, at which point the process is terminated at step 51.

The magnitude of the rotational movement of the engine 16 towards the aligned position may be determined by the controller 30 based on any of several factors, including the degree of misalignment between the steering device 40 and the steerable component 16, the speed at which the vessel 10 is traveling, the acceleration of the vessel 10, the change in angle A of the steering device 40 effectuated by an operator, and the position of the steering device 40. In one embodiment, the progressive rotational movement of the engine 16 towards and aligned position is established by a lookup table accessible by the controller 30. The lookup table may set progressive movements based on any or all of the above-listed factors.

Figure 7A:
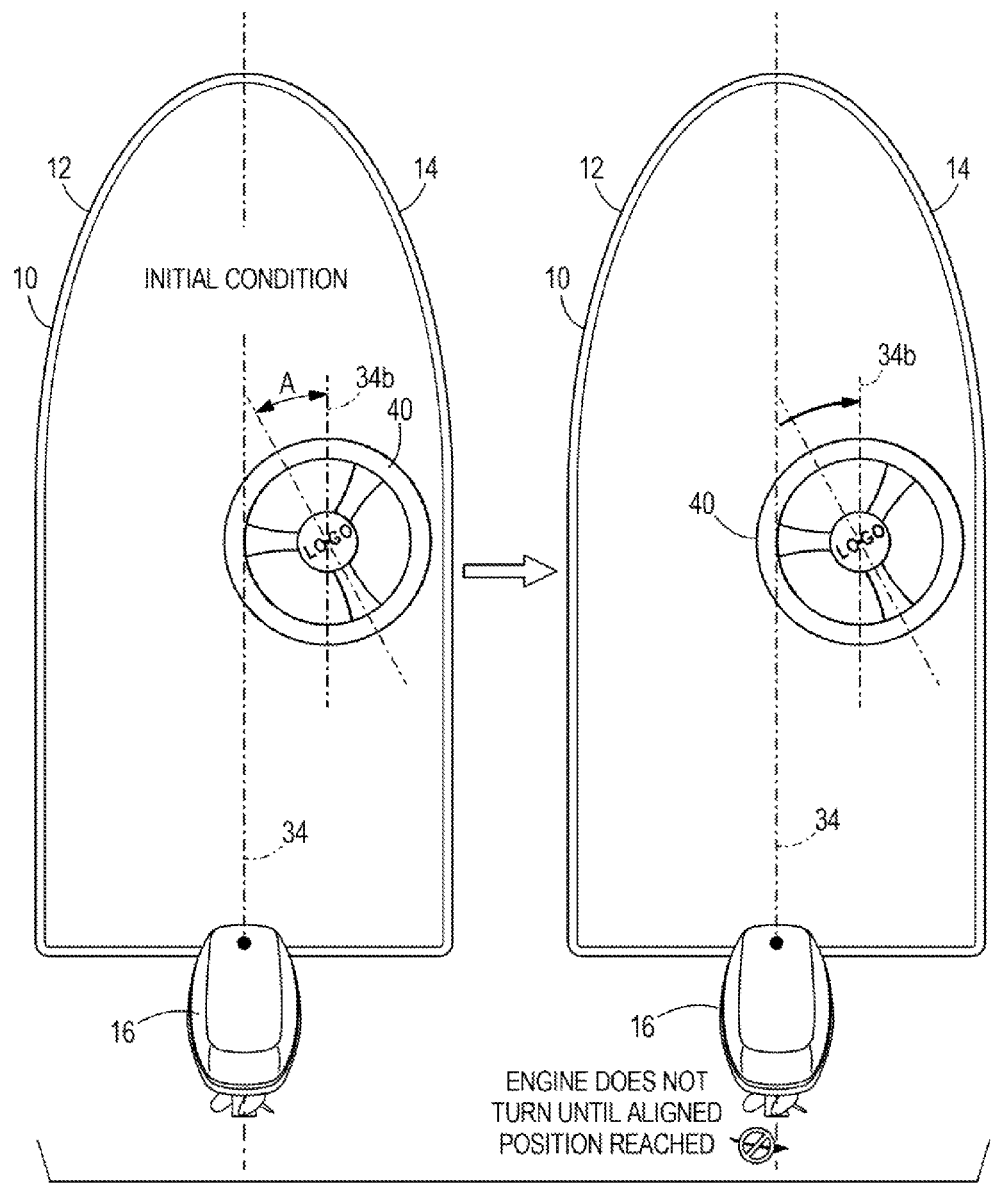
FIGS. 7A and 7B illustrate another embodiment of a system and method of steering alignment.
Figure 7B:
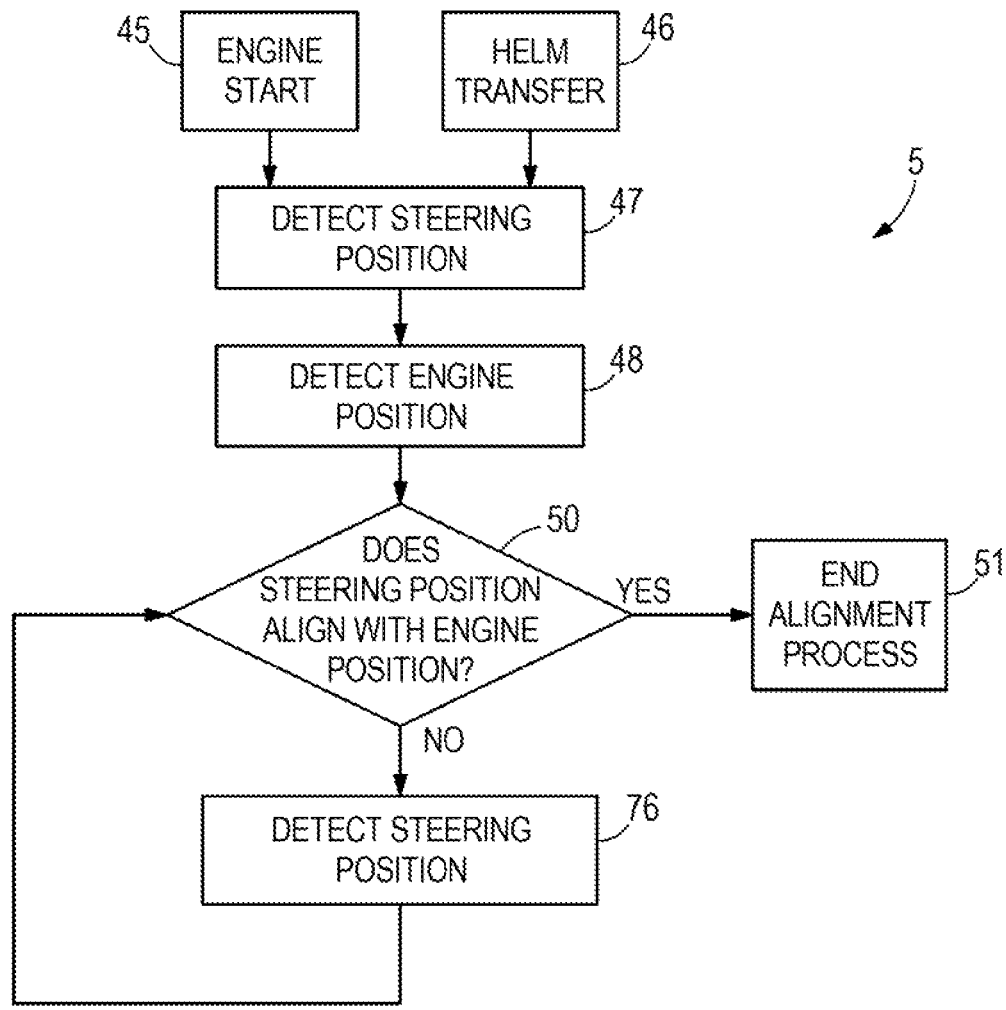

FIGS. 7A and 7B depict another embodiment of a method for controlling steering alignment. In the method depicted in FIGS. 7A and 7B, the operation between the steering device 40 and the engine 16 is adjusted by rotating the engine 16 in response to operator movement of the steering device 40 until the steering device 40 is moved into an aligned position. In FIG. 7A, the engine 16 is in a straight forward position in line with the center line 34. The steering device 40 is misaligned with the engine 16 as it is angled to port by angle A. The method and system depicted in FIG. 7A operate to achieve alignment by not rotating the engine 16 in response to an operator's movement of the steering device 40 until the operator turns the steering device 40 into alignment with the engine 16. Accordingly, in the depicted example the engine 16 is not moved until the steering device 40 is moved by angle A in the starboard 14 direction to center position 43. As shown in FIG. 7B, a method 5 of controlling steering alignment includes steps 45-50 as described above. If the steering device 40 is not in alignment with the engine 16 at step 50, then the system continually checks the steering position at step 76 and checks alignment at step 50 until alignment is detected. Once alignment is reached, the alignment process is terminated at step 51.

Figure 8A:
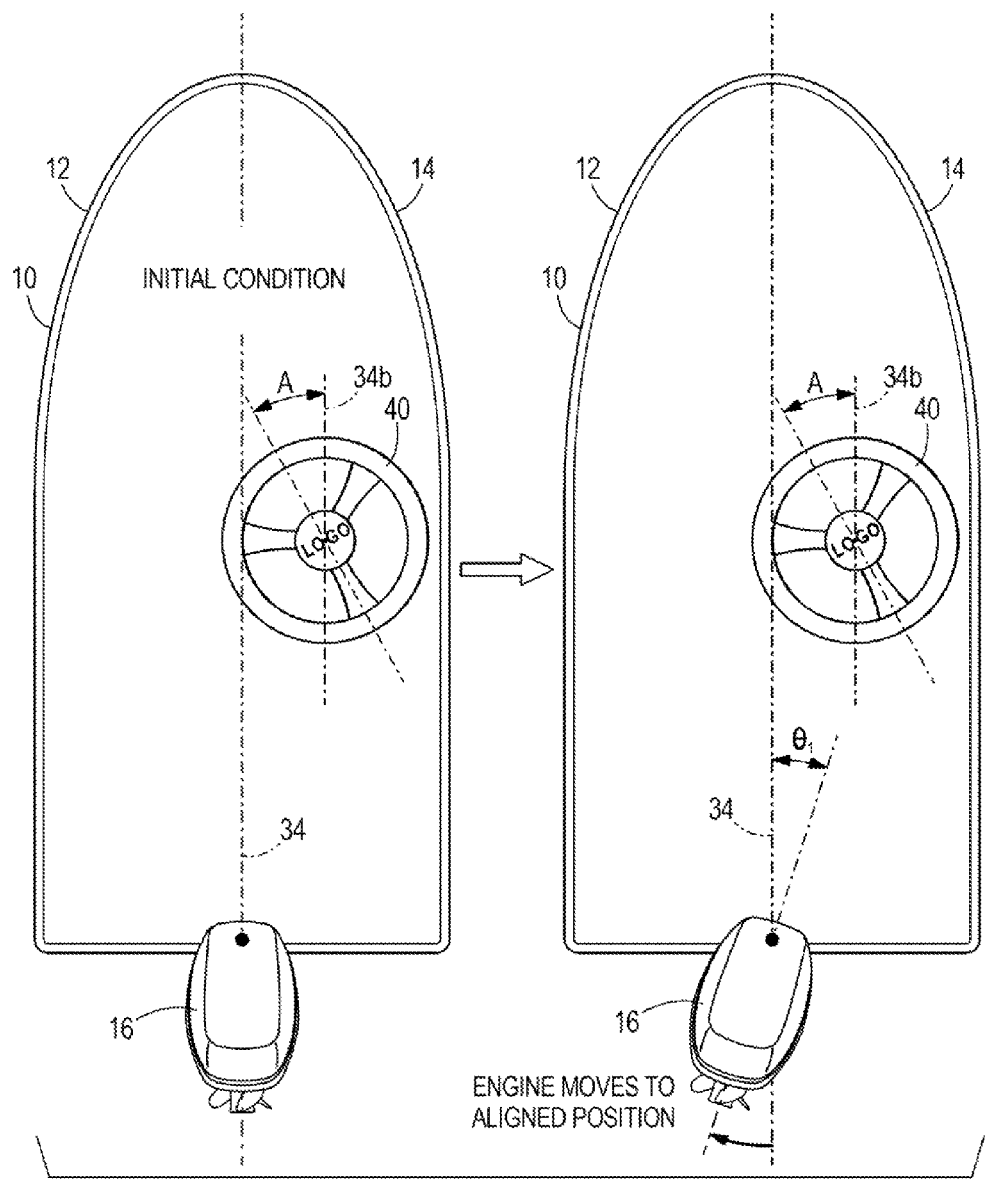
FIGS. 8A and 8B illustrate another embodiment of a system and method of steering alignment.
Figure 8B:
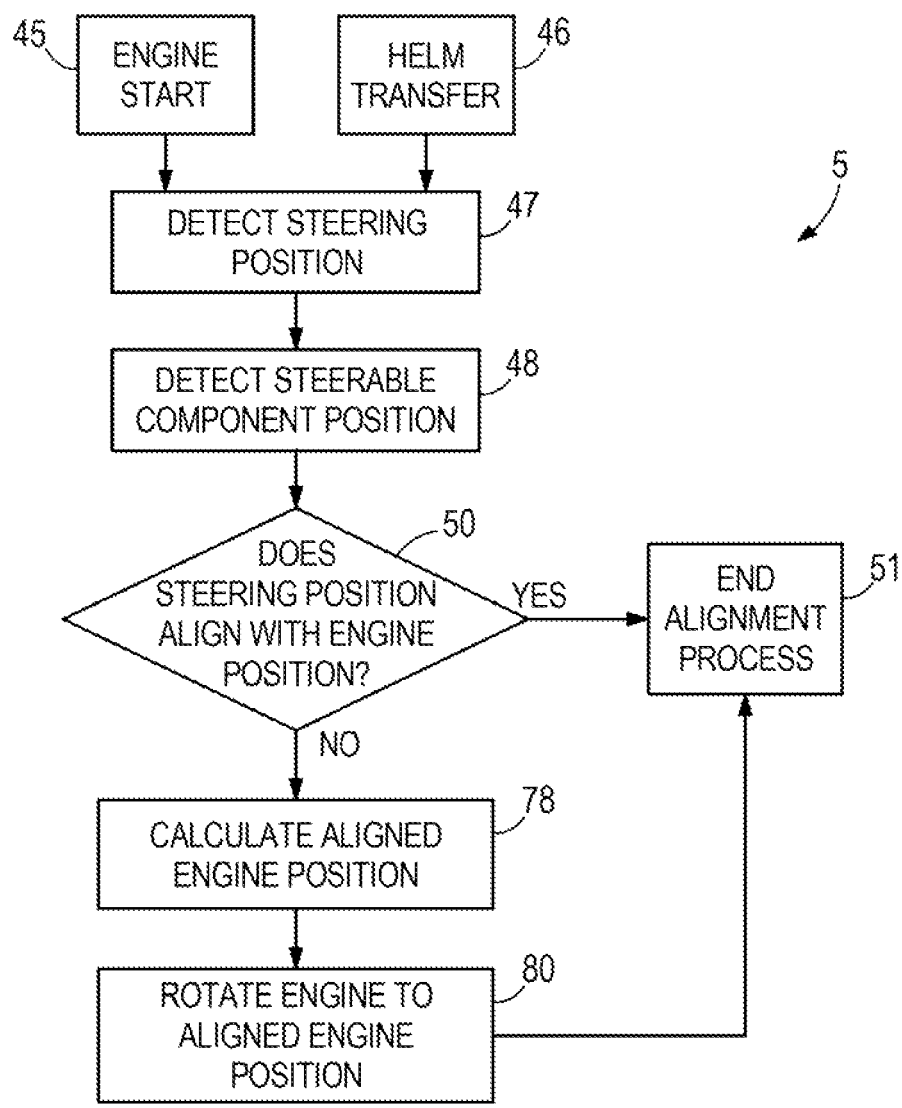

FIGS. 8A and 8B depict another embodiment of a system and method for correcting steering alignment. In this embodiment, when the steering device 40 is misaligned to port 12 by angle A, the system rotates engine 16 from its original, misaligned position to an aligned position where steering angle θ of the engine 16 corresponds to the angle A of the steering device 40. In FIG. 8B, a method 5 of controlling steering alignment includes steps 45-50 as described above. If the steering device 40 and the engine 16 are not aligned at step 50, an aligned position for the engine 16 is calculated that corresponds with the rotational position of the steering device 40. Then, at step 80, the engine 16 is rotated to that aligned position calculated at step 78 such that alignment between the steering device 40 and the engine 16 is reached. The alignment process is then terminated at step 51.

Figure 9:
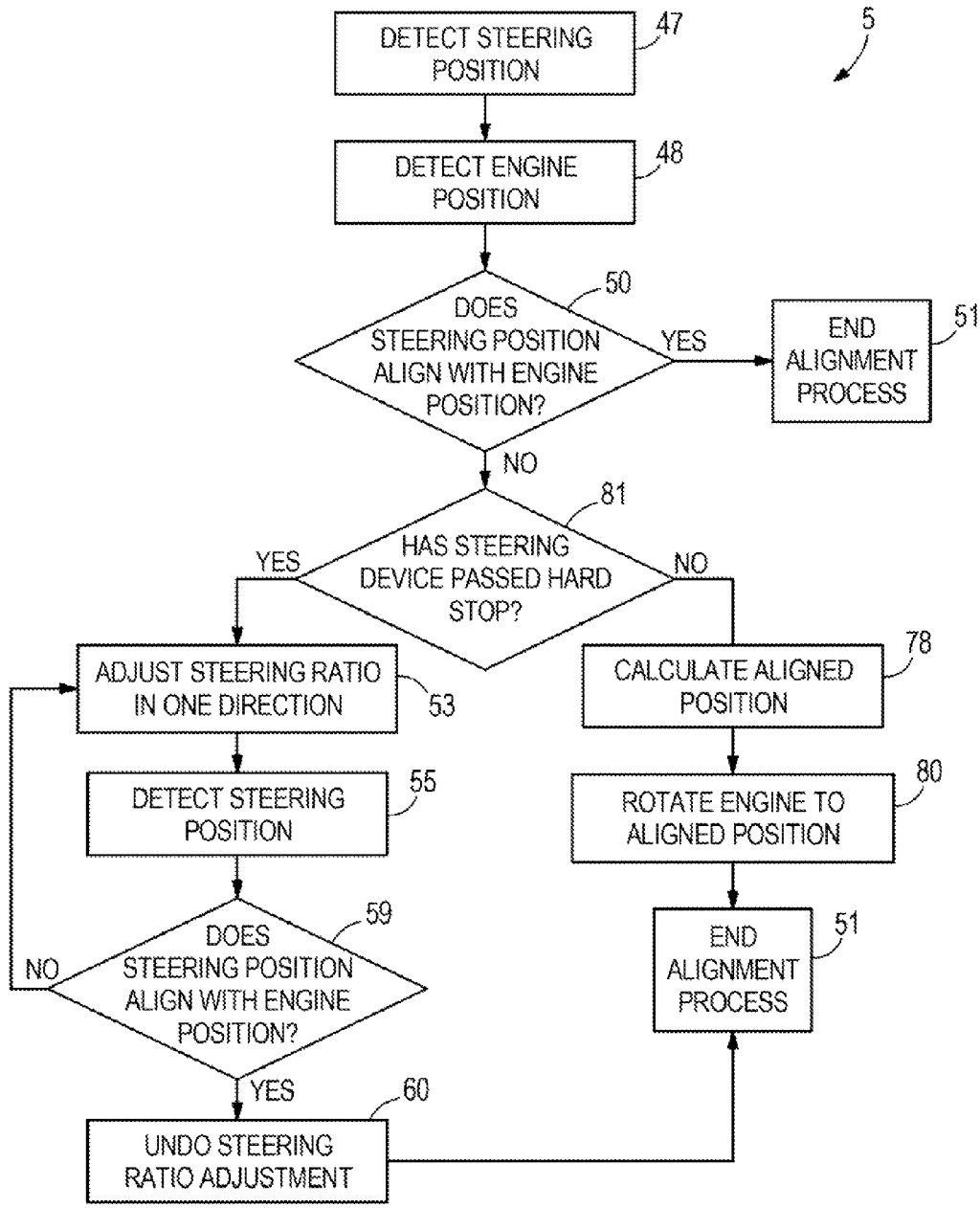
FIG. 9 illustrates yet another embodiment of a system and method of steering alignment.

It is contemplated that the various embodiments of the methods 5 of controlling steering alignment depicted in FIGS. 5-8 may be variously combined and executed to achieve steering device 40 alignment as disclosed herein. For example, the system may execute various methods 5 of controlling steering alignment based on the conditions of the steering device 40, the steerable component 16, or the vessel 10. For example, in the embodiment of FIG. 9, the steering position is detected at step 47 and the engine position is detected at step 48. If the steering position does not align with the engine position at step 50, the system determines at step 81 whether the steering device 40 has passed a hard stop point. As used herein, a hard stop point is where the steering device passes a point corresponding with the maximum turn angle of the steerable component 16. If the steering device 40 has passed the hard stop point, then the controller 30 may proceed to step 53 where it adjusts the steering ratio in one direction at step 53 and then detects the steering position at step 55. If the steering position does not align with the engine position at step 59, then steps 53 and 55 are repeated until alignment is reached. Once alignment is reached, the steering ratio adjustment is removed at step 60 and the alignment process is terminated at step 51. Returning to step 81, if the steering device has not passed the hard stop point, then the controller 30 calculates an aligned position at step 78 and rotates the engine to the aligned position at step 80. Alignment is thereby reached and the alignment process is terminated at step 51.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method of controlling steering alignment in a marine vessel, the method comprising:
    detecting a rotational position of a steering device;
    detecting a rotational position of a steerable component, wherein the steerable component is couplable to the marine vessel and steerable to a plurality of positions so as to control a direction of movement of the marine vessel;
    comparing the rotational position of the steering device to the rotational position of the steerable component;
    detecting a misalignment between the steering device and the steerable component, wherein the misalignment is independent of a steering command by a user to vary the direction of movement of the marine vessel; and
    automatically adjusting relative operation between the steering device and the steerable component while the steering device is moved by the user to control the direction of movement of the marine vessel until alignment between the steering device and the steerable component is reached.

2. The method of claim 1 wherein the automatically adjusting operation between the steering device and the steerable component includes adjusting a steering ratio between the steering device and the steerable component to require relatively more movement of the steering device in one rotational direction than in an opposite rotational direction.

3. The method of claim 1 wherein the automatically adjusting the operation between the steering device and the steerable component includes automatically rotating the steerable component incrementally towards an aligned position, wherein the rotation of the steerable component is independent of a steering command by the user.

4. The method of claim 3, wherein the step of automatically rotating the steerable component gradually towards the aligned position includes rotating the steerable component to a point between its current position and the aligned position, and then redetecting the rotational position of the steerable component and recalculating the aligned position.

5. The method of claim 1 wherein the detecting the rotational position of the steering device, detecting the rotational position of the steerable component, and comparing the rotational position of the steering device to the rotational position of the steerable component are executed upon key-up and helm transfer.

6. A method of controlling steering alignment in a marine vessel, the method comprising:
    detecting a rotational position of a steering device;
    detecting a rotational position of a steerable component, where in the steerable component is couplable to the marine vessel and steerable to a plurality of positions so as to vary a direction of movement of the marine vessel;
    comparing the rotational position of the steering device to the rotational position of the steerable component;
    detecting a misalignment between the steering device and the steerable component, wherein the misalignment is independent of a steering command by a user to vary the direction of movement of the marine vessel;
    calculating an aligned position of the steerable component that corresponds with the rotational position of the steering device; and
    automatically rotating the steerable component incrementally towards the aligned position, wherein the rotation of the steerable component is independent of a steering command by the user.

7. The method of claim 6 wherein the rotating the steerable component is executed while the steerable component is in a forward drive gear.

8. The method of claim 7 wherein the step of automatically rotating the steerable component incrementally towards the aligned position includes rotating the steerable component by an increment to a point between the rotational position and the aligned position, and then redetecting the rotational position of the steerable component and recalculating the aligned position.

9. The method of claim 8 further including repeating the steps of claim 8 until the difference between the rotational position of the steerable component and the aligned position is less than the increment.

10. The method of claim 8, wherein the increment is determined based on at least one of a degree of misalignment between the steering device and the steerable component, a speed of the marine vessel, an acceleration of the marine vessel, and the rotation position of the steering device.

11. The method of claim 6 further including determining whether the steering device has passed a hard stop point; and
wherein, if the steering device has passed the hard stop point, the step of automatically rotating the steerable component towards the aligned position includes rotating the steerable component to a position associated with the hard stop point.

12. The method of claim 11 further including altering a steering ratio to require relatively more movement of the steering device in one rotational direction than in an opposite rotational direction.

13. The method of claim 6 wherein the detecting the rotational position of the steering device, detecting the rotational position of the steerable component, and comparing the rotational position of the steering device to the rotational position of the steerable component are executed upon key-up and helm transfer.

14. A system for controlling steering alignment in a marine vessel, the system comprising:
a steering position sensor that senses a rotational position of a steering device;
a component position sensor that senses a rotational position of a steerable component coupled to the marine vessel and steerable to a plurality of positions so as to vary a direction of movement of the marine vessel;
a steering actuator communicatively connected to the steering device and the steerable component to actuate steering of the marine vessel;
a controller communicatively connected to the steering actuator; and
wherein the controller compares the rotational position of the steering device to the rotational position of the steerable component and controls the steering actuator to change a steering ratio between the steering device and the steerable component while the steering device is moved by a user to require relatively more movement of the steering device in one rotational direction than in an opposite rotational direction to adjust alignment between the steering device and the steerable component.

15. The system of claim 14 wherein the controller automatically rotates the steerable component towards a position corresponding to the rotational position of the steering device.

16. The system of claim 14 wherein the detecting the rotational position of the steering device, detecting the rotational position of the steerable component, and comparing the rotational position of the steering device to the rotational position of the steerable component are executed upon key-up and helm transfer.

* * * * *